J. NIELSEN.
MILKING MACHINE.
APPLICATION FILED SEPT. 9, 1908.
917,888.
Patented Apr. 13, 1909.
2 SHEETS—SHEET 1.
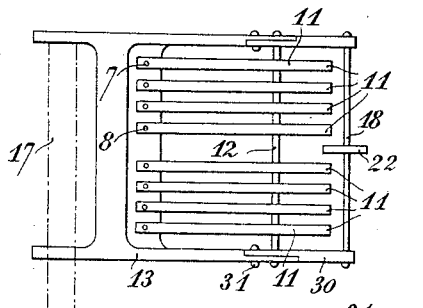
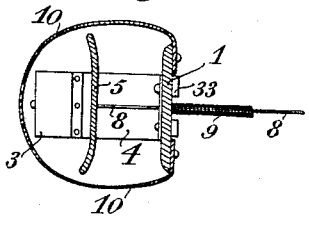
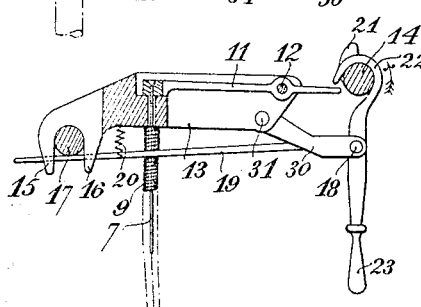
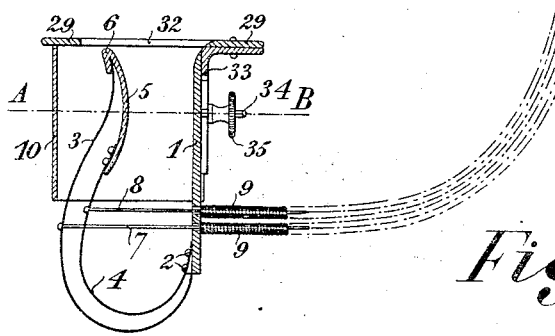
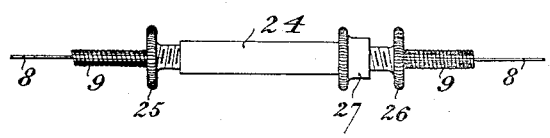
Witnesses.
Jesse N. Sutton
B. V. Dommers
Inventor.
Jens Nielsen
By Henry Orth Jr
Atty.

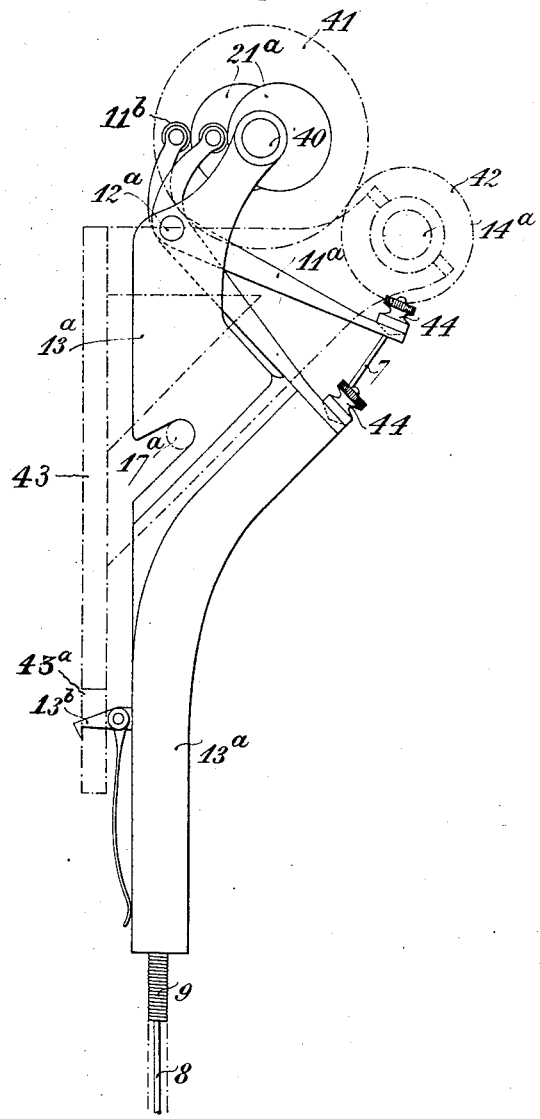

UNITED STATES PATENT OFFICE.

JENS NIELSEN, OF COPENHAGEN, DENMARK.

MILKING-MACHINE.

No. 917,888.          Specification of Letters Patent.        Patented April 13, 1909.

Application filed September 9, 1908. Serial No. 452,252.

*To all whom it may concern:*

Be it known that I, JENS NIELSEN, of No. 7 Vestervoldgade, Copenhagen, in the Kingdom of Denmark, wholesale dealer, have invented certain new and useful Improvements in Milking-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to driving mechanism adapted for use with milking machines of the kind in which the milking is carried out by clamping the teats of the animal between a fixed surface and a surface having a reciprocating motion, or between two surfaces which can be moved toward or away from each other.

According to the invention the movement is conveyed to the surface, or to the two movable surfaces, above mentioned, by means of a flexible wire or the like, inextensible in the direction of its length, which is inclosed in a flexible tube incompressible in the direction of its length, the said wire being capable of moving up and down within the said tube. If the tube and the wire be sufficiently flexible, the capacity for use of the milking apparatus will only depend to a small extent upon the position of the motor; thus obviating one of the greatest difficulties in the use of the milking machine.

To enable the invention to be fully understood I will describe it by reference to the accompanying drawings which illustrate the invention.

Figure 1 is a vertical section through a milking apparatus which is actuated according to my invention that is to say by a row of levers which are driven by means of eccentrics or cams from a rotating shaft running through the cow shed or the like. Fig. 2 is a section on the line A—B, Fig. 1, Fig. 3 is a plan view of a portion of Fig. 1, Figs. 4 and 5 are detail views of modifications, Fig. 6 is an elevation of a modified form of frame and operating mechanism.

The milking apparatus shown in Figs. 1 and 2 consists of a plate 1 which may be of aluminium, to which are fastened, by means of rivets or bolts 2, two long curved flat springs 3 and 4. 5 is a convex plate or shield, the upper edge 6 of which is bent back so as to form a groove for the reception of the end of the spring 3. At its lower part the plate 5 is suitably secured to the spring 4 or is connected thereto by a joint. 7 and 8 are cords of steel wire. The cord 7 passes freely through a hole in the spring 4 but is rigidly connected to the spring 3. The cord 8 is rigidly connected to the spring 4. Both cords pass freely through holes in the plate 1 and each of them is surrounded on the outside by a tightly coiled incompressible steel spring 9; one end of each of these springs abuts against the plate 1. A cap 10 of flexible material, such as impregnated fabric, leather, or the like is secured to the plate 1 in such a manner that it can be opened on one side when the apparatus is placed in the working position. The mechanism for operating the milking device consists of eight levers 11 which are pivoted upon a common shaft 12. This shaft 12 is carried in a frame 13 which can be suspended by simple and suitable means in a proper position with reference to the driving shaft 14. One end of one of the cords 7 or 8 which pass loosely through a hole in the frame 13, is secured to one of each of the levers 11 pivoted upon the shaft 12. The spiral wires 9 which abut at one end against the plate 1 rest at their other ends upon the lower side of the frame 13. The frame 13 is provided on its lower side with two forks having prongs 15, 16, by which means the said frame can be suspended from a rod or tube 17, to which it is secured by means of an arm 19 pivoted upon a rod 18 and pressed by means of a spring 20 against the rod 17. The levers 11 are actuated by eccentrics or cams 21 arranged on the driving shafts 14, a separate cam being provided for each lever. Since it is of importance that the distance between the levers 11 and the horizontal axis of the shaft 14 shall always be exactly the same, the frame 13 is not only suspended to the rod 17 but is also suspended from the rotating shaft 14, by means of a hook 22 mounted upon the rod 18. The hook 22 is furnished with the handle 23 by means of which it may be put in place upon the shaft 14. Since the hook grasps the shaft 14 between two of the eccentrics or cams it at the same time prevents the frame 13 from moving laterally thus insuring that each eccentric or cam lies opposite one of the levers. The portion 30 of the frame 13 which carries the rod 18 may be pivotally mounted on the pin 31 so as to enable the position of the levers 11 relatively to the shaft 14 to be easily and quickly adjusted.

Fig. 5 shows a modified form of construction of suspending hook which is adapted to be loosely secured to the shaft 14 by the side of the eight eccentrics or cams, and to engage with the shaft 18 and thereby hold the apparatus fast when the frame 13 is suspended. This hook consists of two parts 36 and 37 of which the latter can be screwed into the former so as to alter the length of the hook, a lock-nut 38 being provided. This form of construction of the suspending hook has the advantage that the adjustment in the pressure required for milking any particular cow can be made once and for all by the adjustment of the hook hung opposite that cow.

The milking apparatus shown in Figs. 1 and 2 is arranged for the reception of a single teat. The apparatus can however be also used for the reception of two teats if the two plates between which the two teats are compressed are made wide enough to allow room for the two side by side. By this construction the apparatus is made somewhat simpler since only two cords 7 and 8 are required for dealing with two teats. Instead of one pair of cords 7 and 8, two pairs may also be employed which may be arranged in pairs under one teat, the method of construction being thus similar to that shown in Figs. 1 and 2. The cords may also be arranged at the sides of or quite outside the space which is traversed by the milk, this rendering it easier to protect them against rust or the like. In this case the shield 5 could be provided with lugs which project through holes in the surrounding casing of flexible material. For the case in which only four wire cords 8 are used, the frame 13 is only provided with four levers and the shaft 14 with four eccentrics or cams.

Fig. 4 shows a tension device which can be applied at any point in a cord between the milking device and the operating mechanism. The coiled spiral spring which forms the tube 9 is here cut away so that a certain length of the cord itself lies free. Around the cord there is placed a tube 24 provided with an internal screw thread; and plugs 25, and 26 are screwed into each end of this tube each plug being provided with milled edges so that they can be easily turned by the fingers. As a further safeguard they may be furnished with a lock nut as shown at 27. The one nut can then be suitably used to compensate the elongation which the cord undergoes during use as the result of the stretching of its substance, while the other can be employed to effect a firmer or gentler milking by making the cord longer or shorter.

The milking apparatus may be fastened to a belt going over the back of the cow in which belt is provided a plate 29 with openings 32 for the teat. An angle piece 33 having a long slot made in its descending limb may be applied to the plate 29. In this slot a screw bolt 34 fastened to the plate 1 can slide up and down and be fixed in the proper position by a nut 35.

The operation of the milking machine is as follows: For each stall or for every two stalls a set of 8 eccentrics 21, corresponding to the number of levers 11, is arranged upon the shaft 14 which passes through the cow shed. The frame 13 and the teat apparatus are used for a series of cows and are moved along during the milking, from cow to cow. The teat apparatus may as stated be hung upon the cow by means of a belt and is adjusted to the right height with reference to the teats by means of the bolt 34 and the nut 35. The frame 13 is arranged opposite the proper set of eccentrics or cams, as shown in Fig. 1 by first hooking it upon the rod or tube 17, and then when everything is ready for starting milking it is swung upward in such a way as to cause the hook 22 to grip the shaft 14. If necessary the position of the arm 30 is shifted to allow the teats to be acted on more gently or more firmly. When the frame is put in position the eccentrics 21 impart a rocking motion to the levers 11. This motion is so regulated as to impart to the shield 5 just the action most favorable for milking, that is to say, first a gentle pressure of the uppermost part of the shield 5 against the base of the teat and then a soft and yielding rolling along the teat whereby the milk is pressed out of the latter just as in milking by hand. Since the spiral springs are incompressible it is exactly the same as if the frame 13 were placed just above the plate 1, and the springs 3 and 4 will respond to the motion of the cords 7 and 8 exactly, without being affected by any lateral curvature which the latter may undergo.

In the modification shown in Fig. 6 a short shaft $12^a$ is journaled in a frame $13^a$ and forms a pivot for a plurality of bell-crank levers $11^a$ having anti-friction rollers $11^b$ mounted in the short arms thereof. These rollers rest against cam disks or eccentrics $21^a$ carried by a shaft 40 journaled in the frame $13^a$ parallel to the shaft $12^a$. The shaft 40 is further provided with a gear wheel 41, shown in dotted lines, which when the frame is fixed in position engages a gear wheel indicated by 42, fixed upon a driving shaft $14^a$ journaled in a bracket 43. This driving shaft is provided with a gear wheel 42 at each of the places where the frame $13^a$ is to be fixed; the frame is supported by a rod $17^a$ fixed in the brackets and is kept in position by means of a spring hook $13^b$ on the frame engaging a notch $43^a$ in the bracket. In this construction the wires 7 and 8 are screw-threaded at their extremities which pass through the long arms of the lever 11ª and may be slackened or tightened by nuts 44 working on the screw threads.

The machine illustrated in the drawings is provided with eight cords 7, 8, but as has been stated above the machine may be easily adapted to work with four cords. The machine may also be arranged to work with two cords, or even with a single one; this renders the transmission of the power still simpler.

Having now particularly described and ascertained the nature of my said invention and in what manner the same is to be performed, I declare that what I claim is:

1. In a milking machine in combination with a teat engaging device, springs connected thereto, and means to move the springs to impart a rocking movement to the device.

2. In a milking machine, a teat engaging device comprising a pair of coöperating pressure members, springs on one of said members, and means to alternately compress said springs to impart a rocking movement to one of said members.

3. In a milking machine, a teat engaging device, comprising a pair of coöperating pressure members, springs on one of said members connected to the opposite end of the other member, and means to alternately compress said springs to impart a rocking movement to said other member.

4. A milking device comprising a stationary rigid plate looped springs secured to one end thereof and a rigid plate having said springs secured to its opposite ends.

5. A milking device comprising a stationary rigid plate, looped springs secured to one end thereof, a rigid plate having said springs secured to its opposite ends and means to alternately compress said springs to impart a rocking movement to the rigid plate.

6. In a milking machine, the combination with coöperating pressure members, of means for imparting a relative movement thereto comprising a flexible body connected with said members, a flexible casing inclosing the body and means to reciprocate the latter in the casing.

7. In a milking machine, the combination with a pair of coöperating pressure plates, of means for imparting a relative movement thereto comprising an inextensible flexible body connected to one of said plates, a flexible noncompressible casing inclosing said body, and means to reciprocate the latter in the casing.

8. In a milking machine the combination of a stationary pressure plate, a spring supported member adapted to coöperate therewith, a wire connected at one end with the spring supported member, a guiding casing for the wire, a pivoted lever connected to the other end of said wire, and means to rock said lever on its pivot.

9. In a milking machine, the combination of a stationary pressure plate, a spring supported plate adapted to coöperate therewith, a wire connected at one end with the spring supported plate, a support, a lever pivoted therein connected to the other end of the wire, a non-compressible flexible casing inclosing said wire abutting against the pressure plate and support, and means to rock the lever on its pivot.

10. In a milking machine, a teat engaging device comprising a stationary plate, looped springs secured to one end thereof, a coöperating pressure plate having said springs connected thereto at its opposite ends, a wire connected to each of said springs, a lever connected to each of the wires, a support in which said levers are pivoted, a tube inclosing each wire adapted to form a guide therefor, and means to alternately rock the levers.

11. In a milking machine, the combination with relatively movable teat engaging members, of means for actuating said members comprising a plurality of wires connected therewith, guides for said wires, pivoted levers connected at one end to the latter, a rotatable shaft, and means on the latter adapted to engage the other ends of the levers and alternately rock the same to actuate the teat engaging members.

12. In a milking machine, the combination of a stationary plate, springs connected thereto, a plate coöperable with the stationary plate connected at both ends to the springs, a wire connected to each of the springs, a rotatable shaft, a fixed support mounted parallel thereto, a frame mounted on the support and loosely connected with the shaft, a plurality of levers pivoted in the frame having one end connected to the wires, a plurality of cams on the shaft adapted to engage the free ends of the levers, and a non-compressible flexible casing inclosing each of said wires interposed between and abutting against the stationary plate and frame.

13. In a milking machine, the combination with a teat engaging device, of wires for operating the same, flexible non-compressible tubes inclosing the wires, and means for adjusting the length of the tubes to correspond with the length of the wires.

In testimony that I claim the foregoing as my invention, I have signed my name in presence of two subscribing witnesses.

JENS NIELSEN.

Witnesses:
ERNEST BOUTARD,
P. HOFMAN BARY.